Dec. 16, 1952 — T. R. HOMER — 2,622,124
ELECTRICAL LOGGING IN WELL BORES
Filed Sept. 13, 1948
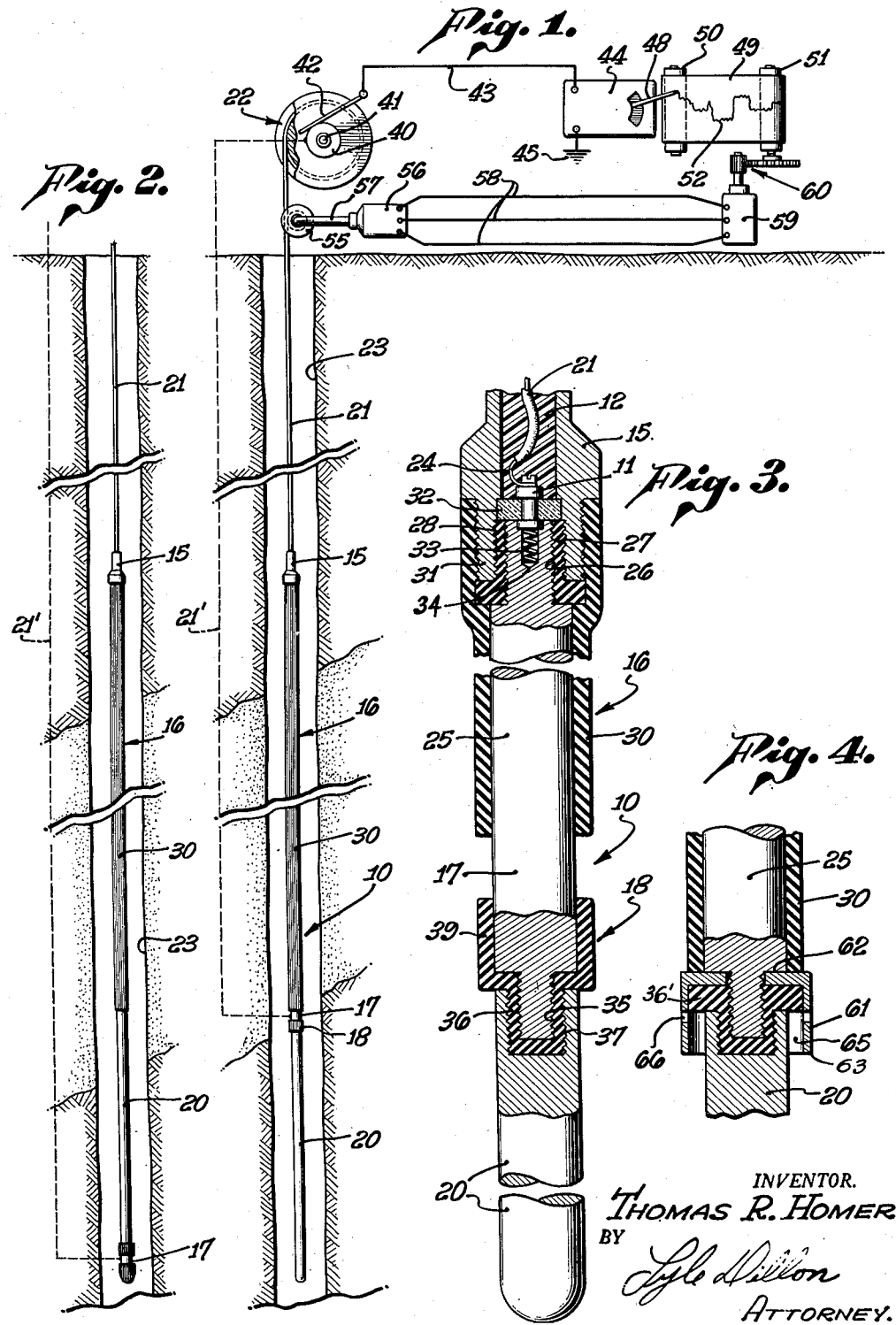
INVENTOR.
THOMAS R. HOMER,
BY
Lyle Dillon
ATTORNEY.

Patented Dec. 16, 1952

2,622,124

UNITED STATES PATENT OFFICE 2,622,124

ELECTRICAL LOGGING IN WELL BORES

Thomas R. Homer, Bellflower, Calif., assignor to Lane-Wells Company, Los Angeles, Calif., a corporation of Delaware Application September 13, 1948, Serial No. 48,956

15 Claims. (Cl. 175—182)

This invention relates to the art of electrical logging of earth boreholes for the purpose of determining the nature and arrangement of the geological formation structures penetrated or traversed by such boreholes.

In the so-called "spontaneous potential" or "natural potential" method of electrical logging, an exploring or test electrode is usually lowered down the well borehole containing well fluid, usually an aqueous, electrically conductive drilling liquid such as mud. The test electrode is electrically connected through a suitable conductor incorporated in the cable by which it is lowered and suspended in the borehole, and through a suitable electric meter, to a ground connection preferably remote from the test electrode, such as at the ground surface. The electric meter usually is of the recording galvanometer type whereby a permanent record of variations in natural potential are drawn upon a moving chart to form a curve or graphical record of natural potential amplitude versus well depth, as is well known in the art.

In some cases and for various reasons the natural potentials at the pick-up electrode within a borehole may be feeble and of indistinct variation. For example, under conditions where the fluid contained within the well borehole has become saline or where the formations under investigation are low in salt or other electrolytic content such as for an extreme example fresh water-containing sands, the natural potential differences are unusually low. Under those latter conditions it is often difficult to obtain a natural potential log graph which contains sufficiently distinct detail to be capable of being interpreted properly in terms of the stratigraphy concerned.

It is accordingly an object of this invention to increase the sensitivity of the natural potential electrical logging system.

It is another object of this invention to provide a system for obtaining greater amplitude in the natural potential variations at the pick-up electrode.

It is still another object of this invention to provide a natural potential electrical logging system by means of which greater detail or definition in the resulting natural potential log graph may be obtained.

It has been discovered that the objects of this invention can be obtained, in general, by employing in addition to the conventional natural potential pick-up electrode and the usual electrical circuit associated therewith, an additional or auxiliary electrode in the form of an uninsulated, elongated conductor bar with one end thereof positioned closely adjacent to but spaced axially from the pick-up electrode with the said spacing between the electrodes being small as compared to the length of said auxiliary electrode. The auxiliary electrode is electrically unconnected in any manner with the pick-up electrode or other portions of the natural potential measuring circuit associated therewith except by way of the well fluid in which it is normally immersed during logging operations. The manner in which such an auxiliary electrode acts to augment the amplitude and sensitivity of the natural potential recordings is not yet entirely understood, but it is believed to operate as a current collector for the pick-up electrode and possibly as a shield from or equalizer of certain of the differential potentials in the formations extending along the borehole a short distance from the immediate proximity of the pick-up electrode and which otherwise may be superimposed upon the picked-up potentials in such manner as to partially neutralize or mask the detailed potential variations occurring at the immediate location of the pick-up electrode.

In any event, whatever the true mode of operation may be, the presence of such an auxiliary electrode has been discovered to result in an improved natural potential electrical log by augmenting the overall useful amplitude detail and definition of the resulting log curve.

These and other objects, advantages and features of novelty will be evident hereinafter.

In the drawings which show by way of illustration preferred embodiments of the invention and in which like reference characters designate the same or similar parts throughout the several views:

Figure 1 is a schematic diagram of the arrangement of the electrical logging apparatus and electrical circuit of the invention as employed in connection with a well borehole.

Figure 2 is a schematic diagram of an alternative arrangement of a portion of the electrical logging apparatus of Figure 1.

Figure 3 is a longitudinal sectional view of a typical electrode assembly construction of the type employed in connection with the apparatus of Figure 1.

Figure 4 is a fragmentary longitudinal sectional view of a modification of a portion of the apparatus of Figure 3.

The apparatus is as follows:

Referring primarily to Figures 1 and 3, 10 is an electrode assembly adapted to be run into a well borehole on a cable and comprising, in general, a cable head 15, a relatively long insulated body 16, a relatively short pick-up electrode 17, an insulating spacer or coupling 18 and an elongated auxiliary electrode 20, all mechanically coupled coaxially end to end as shown but each electrically insulated from one another. Various suitable constructions may be employed for this electrode assembly as, for example, that illustrated in Figure 3 and hereinafter more fully described.

A conductor cable by means of which the electrode assembly 10 is run into and suspended in the borehole is shown at 21 extending from a drum 22 at the earth surface, upon which it is reeled, into the earth borehole 23 to the electrode assembly cable head 15. Such cable may be, for example, a wire rope carrying an insulated conductor wire at its core. One example of such a cable is that disclosed in Wells 2,043,400 and 2,043,401. The cable head 15 may be constructed and the conductor cable connected to it in a manner similar to that disclosed in Turechek 2,043,341, the conductor extending from the cable being as shown therein at 1b encased in an insulating compound 12 and terminating at the binding post or terminal bolt 11.

Referring primarily to Figure 3, a more detailed description of the manner in which the electrode assembly 10 may be constructed is as follows:

The elongated insulated body 16 may be composed of a metal core or rod 25 threaded at 26 at its upper end into an annular, insulating bushing 27 which is in turn threaded at 28 into the inside of the bottom opening of the beforementioned cable head 15. The rod 25 is thus attached coaxially with but electrically insulated from the metal parts of the cable head 15. The external surface of the rod 25 with the exception of a portion adjacent the lower end thereof and constituting the pick-up electrode 17, is covered with a coating of insulating material 30 such as rubber, neoprene or the like, preferably bonded to the rod in fluid tight and firm physical attachment thereto. The upper end portion of the insulating coating 30 is preferably carried up over the lower externally threaded end of the downwardly extending annular coupling portion 31 of the cable head 15, to form a connection therebetween sufficiently fluid tight to exclude fluid from entering the coupling between the upper end of the rod 25 and the bottom end 31 of the cable head.

The electrical circuit between the conductor 24 contained in the conductor cable 21 and the top end of the rod 25 is completed through the connector or terminal bolt 11 extending through an insulating separator disc 32 and thence through a helical spring 33 retained, under compression, in a coaxial, drilled recess 34 and which makes pressure contact between the rod 25 and the bottom end of the bolt 11.

The lower end of the rod 25 makes threaded connection at 35 into an insulating spacer bushing 36 which in turn threads at 37 into the top end of the elongated auxiliary electrode 20. The spacer bushing is provided with an upwardly extending annular sleeve portion or skirt 39 which fits snugly around the bar 25 adjacent to, but spaced longitudinally a short distance from, the lower end of the insulating coating 30 and thereby determines the length of exposed surface of the bar 25 which constitutes the beforementioned pick-up electrode 17. The auxiliary electrode 20 is thus mechanically attached, coaxially, to the bar 25 but is electrically isolated therefrom and thus is isolated from the pick-up electrode.

While one mode of construction is illustrated in Figure 3 as hereinbefore described, other variations and modifications of such construction are possible. For example, in Figure 4 a modified form of pick-up electrode construction is shown which may be substituted for that shown in Figure 3 with satisfactory results. In this modified construction an inverted cup-shaped, metal pick-up electrode member as shown at 61 is substituted for the exposed area 17 of the bar 25 shown in Figure 3. The cup-shaped electrode member 61 is clamped in the threaded insulated joint between the bottom annular shoulder 62 of bar 25 and the upper annular surface of the insulating bushing 36' whereby the said cup-shaped member is electrically connected to the bar 25 and thence to the cable conductor 21 in the manner hereinbefore described, but is insulated from the auxiliary electrode 20.

The downwardly directed annular skirt portion 63 of the cup-shaped member 61 is concentrically positioned around the upper end portion of the auxiliary electrode 20 and has an inside diameter sufficiently greater than the outside diameter of the auxiliary electrode 20 at that point to provide an annular spacing therebetween as shown at 65.

A plurality of perforations are provided through the skirt 63 as shown at 66 to permit well fluid to circulate through and fill the annular space 65.

The electrical circuit of the beforementioned conductor 21, forming the core of the cable 23 is diagrammatically represented by the dotted line at 21' and it makes electrical connection at the lower end through the cable head 15 and electrode assembly, as beforedescribed, to the pick-up electrode 17, and at the upper end it makes electrical connection with a slip ring 40 mounted on the drum 22 or drum shaft 41.

A stationary brush 42 makes sliding electrical contact with the said slip ring 40 and this in turn is connected through conductor 43 to one terminal of a metering apparatus or galvanometer 44, the opposite terminal of which is grounded at 45.

The hand 48 of the metering apparatus or galvanometer 44 carries a pen which bears upon a strip of graph or chart paper 49 arranged to be moved between rollers 50 and 51 for the purpose of tracing a curve or making a graph as illustrated at 52. The rate of motion of the paper 49 is preferably proportional to the rate of motion of the electrode system 10 into or out of the borehole 23, and this proportional motion may be accomplished by coupling an idler pulley 55 over which the conductor cable 21 passes in frictional engagement, with the paper transporting mechanism through suitable means such as by a shaft, belt or the like mechanical device similar to those disclosed in Jakosky Re. 21,797 or Elliott 2,222,608 or by suitable electro-mechanical means as disclosed in Bowsky et al. 2,142,555 or as schematically illustrated in Figure 1 hereof, whereby a selsyn generator 56 is driven through shaft 57 or other suitable mechanical coupling means from the idler pulley 55, and this generator is in turn electrically coupled through conductors 58 to a selsyn motor 59 which in turn remotely drives the paper transporting roll 51 through suitable reduction gearing as illustrated at 60.

Referring now primarily to Figure 2 in which an alternative arrangement of the electrode structure is shown, the mechanical construction is similar but the arrangement of the electrodes is reversed as compared to that illustrated in Figures 1 and 3. In the arrangement of Figure 2 the pick-up electrode 17 is positioned below the relatively long auxiliary electrode 20, suitable internal electrical connections being provided to connect only the pick-up electrode 17 with the conductor 21, 21' while maintaining the auxiliary electrode 20 electrically isolated from both the pick-up electrode 17 and the cable head 15.

The rod 25 comprising in part the pick-up electrode 17 of the apparatus of Figures 1 and 3, the pick-up electrode 17' of Figure 2 and the cup-shaped electrode element 61 of Figure 4, and also the auxiliary electrode 20 may be made of a suitable metal such as brass, preferably lead coated at the areas exposed to the well fluid. The insulating bushings shown at 27, 36 and 36' may be composed of a suitable insulating material such as, for example, "Bakelite," "Lucite," hard rubber or the like.

The galvanometer or metering mechanism diagrammatically shown at 44 in the drawings may include the usual and conventional circuits for variation of its sensitivity and also if desired suitable amplification means.

An important feature of this invention resides in the discovery that while mere increase of sensitivity of the natural potential measuring circuit, such as by removing resistance from the meter circuit or by employing amplification of the input current or voltage to the meter, will not increase the distinctness of detail or useful definition of the recorded natural potential curve, such distinctness of detail and useful definition is substantially increased by use of the auxiliary electrode of this invention as herein described. In other words, an important advantage of this invention resides in the resultant improved legibility of the recorded natural potential curve.

Suitable dimensions for the hereinbefore described electrode assemblies 10 and 10' which have been found to give satisfactory results in accordance with this invention are as follows:

The length of the section shown at 16 or 16' covered by the insulating coating 30 may be approximately 100 feet, the diameter of the rod 25 being from approximately 1½ to 3 inches. The thickness of the insulating coating may be any suitable dimension, depending upon the material, generally varying from approximately ⅛ inch to ⅜ inch. In the case of a resilient rubber coating, a thickness of approximately ⅜ of an inch has been found satisfactory. The length of the exposed portion 17 of the rod or core 25, below the lower end of the insulating coating 30 as illustrated in Figures 1 and 3 and which constitutes the pick-up electrode of that version of the apparatus may be approximately 2 inches. The length of the insulating skirt 39 comprising the spacer 18 between the pick-up electrode surface 17 and the uppermost exposed surface of the auxiliary electrode 20, of Figures 1 and 3, may be from approximately ½ inch to approximately 20 inches. The auxiliary electrode 20 may be from approximately 10 feet to approximately 20 feet in length.

In the case of the modification shown in Figure 4, the dimensions of the skirt 63 of the pick-up electrode 61 may be such that the longitudinal depth of the annular space 65 is from approximately ½ inch to 2 inches and the radial width of this space from approximately ⅛ to ½ inch.

In operation the electrode assembly is moved through the fluid-filled well borehole by paying out from or taking up the conductor cable 21 upon the cable drum 22. As the pick-up electrode 17 or 61 in moving through the well borehole passes opposite the different formation strata interfaces intersected by the bore hole the resultant variation in intensity and polarity of the natural potential existing across each such interface and through the well fluid, with respect to the remote ground connection at 45, is picked up or sampled by the pick-up electrode 17 or 61 and in case of the apparatus of Figures 3 and 4 conducted through the bar 25 and cable conductor 24 to the slip ring 40 and thence through brush 42, conductor 43 and meter 44 to the return ground connection 45. The resultant motion of the hand 48 of the meter 44 causes a curve 52 to be drawn upon the moving chart 49 the varying amplitude of which curve constitutes a visual indication or graphical record of a given function of the variations of magnitude of the picked-up natural potentials with relation to the longitudinal position of the pick-up electrode within the well borehole.

In general the natural potential pick-up circuit as employed and described in connection with this invention preferably is designed to draw as little current as possible at the pick-up electrode whereby the potential distribution in the borehole fluid and the surrounding formations will be substantially undisturbed thereby.

Where the words "measure" or "measuring," the "natural potential" or "natural potential difference" or "spontaneous potential" are employed herein in either the specification or claims, such words shall include measuring, indicating or recording relative values or variations in the picked-up potential or resultant current or suitable functions thereof which are not necessarily of known absolute value in terms of amperes or volts.

Where such terms as "elongated," "relatively long," "relatively short," and the like are used herein in either the specification or claims with reference to the positions or dimensions of the electrodes or insulating bodies, it is to be understood that the dimensions thus referred to are generally to be considered as effective dimensions of such electrodes and insulating bodies considered from the standpoint of the dimensions and shapes of the areas thereof exposed to electrical contact with surrounding fluid in the well borehole, and do not necessarily refer to the whole conductive or insulating body or structure which includes as a part thereof the effective electrode or insulation body referred to.

It is to be understood that the foregoing is illustrative only, and that the invention is not to be limited thereby but may include various modifications and changes made by those skilled in the art without distinguishing from the spirit or scope of the invention as defined in the appended claims.

I claim:

1. In electrical logging apparatus wherewith the variation in natural potential difference along the length of a well borehole, relative to a remote ground, is tested by a potential pick-up electrode adapted to be moved longitudinally along such borehole and such picked-up potential difference is conducted between said potential pick-up electrode and said remote ground through a conductor in a conductor cable and through measuring apparatus located at the surface, exterior to said borehole, the apparatus in combination therewith comprising: an elongated electrode spaced longitudinally with respect to its longitudinal axis from said pick-up electrode and adapted thereby to extend axially in said borehole, the space between said electrodes being small as compared to the length of said elongated electrode; and an insulating spacer mechanically interconnecting but electrically separating said electrodes.

2. In electrical logging apparatus wherewith the variation in natural potential difference along the length of a well borehole, relative to a remote ground, is tested by a potential pick-up electrode adapted to be moved longitudinally along such borehole and such picked-up potential difference is conducted between said potential pick-up electrode and said remote ground through a conductor in a conductor cable and through measuring apparatus located at the surface, exterior to said borehole, the apparatus in combination therewith comprising: an elongated electrode spaced longitudinally with respect to its longitudinal axis from said pick-up electrode and adapted thereby to extend axially in said borehole, the space between said electrodes being small as compared to the length of said elongated electrode; said elongated electrode being thereby electrically isolated except by way of contact with conductive fluid in the said borehole.

3. In electrical logging apparatus wherewith the variation in natural potential difference along the length of a well borehole, relative to a remote ground, is tested by a potential pick-up electrode adapted to be moved longitudinally along such borehole and such picked-up potential difference is conducted between said potential pick-up electrode and said remote ground through a conductor in a conductor cable and through measuring apparatus located at the surface, exterior to said borehole, the apparatus in combination therewith comprising: an elongated electrode positioned with one end thereof adjacent said pick-up electrode and adapted to extend axially in said borehole, the space between said electrodes being small as compared to the length of said elongated electrode; and said elongated electrode being electrically isolated except by way of contact with conductive fluid in the said borehole.

4. Electrical logging apparatus according to claim 1 in which the insulating spacer is relatively short as compared with the said elongated electrode.

5. Electrical logging apparatus according to claim 1 in which the said elongated electrode is relatively long as compared to the said potential pick-up electrode.

6. Electrical logging apparatus according to claim 5 in which the insulating spacer is relatively short as compared with the said elongated electrode.

7. A method of electrically logging a borehole containing a conductive fluid comprising: suspending an elongated electrode axially in the borehole to be logged, said elongated electrode being electrically isolated except through contact with surrounding fluid in the borehole; suspending a test electrode in the said borehole adjacent to and axially spaced from one end of said elongated electrode and electrically insulated therefrom except through contact with said fluid, the space between said electrodes being small as compared to the length of said elongated electrode; simultaneously moving the said electrodes along the borehole while maintaining the spacing therebetween constant; establishing a ground connection at a point remote from said electrodes; and measuring the potential difference between said test electrode and said ground connection as said electrodes are moved along said borehole.

8. A method of electrically logging a borehole containing a conductive fluid comprising: suspending an elongated electrode axially in the borehole to be logged, said elongated electrode being electrically isolated except through contact with surrounding fluid in the borehole; suspending a test electrode in the said borehole adjacent the upper end of said elongated electrode and electrically insulated therefrom except through contact with said fluid, the space between said electrodes being small as compared to the length of said elongated electrode; simultaneously moving the said electrodes along the borehole while maintaining the relative positions of said electrodes constant; establishing a ground connection at a point remote from said electrodes; and measuring the potential difference between said test electrode and said ground connection as said electrodes are moved along said borehole.

9. A method of electrically logging a borehole containing a conductive fluid comprising: suspending an elongated electrode axially in the borehole to be logged, said elongated electrode being electrically isolated except through contact with surrounding fluid in the borehole; suspending a relatively short test electrode in the said borehole adjacent the upper end of said elongated electrode and electrically insulated therefrom except through contact with said fluid, the space between said electrodes being small as compared to the length of said elongated electrode; simultaneously moving the said electrodes along the borehole while maintaining the relative positions of said electrodes constant; establishing a grounded connection at a point remote from said electrodes; and measuring the potential difference between said test electrode and said grounded connection as said electrodes are moved along said borehole.

10. An electrical logging apparatus wherewith the variation in natural potential difference along the length of the well borehole, relative to a remote ground, is tested by a potential pick-up electrode adapted to be moved longitudinally along such borehole and such picked up potential difference is conducted between said potential pick-up electrode and said remote ground through a conductor in a conductor cable and through measuring apparatus located at the surface, exterior to said borehole, the apparatus in combination therewith comprising: an elongated electrode spaced axially at one end from said pick-up electrode, said pick-up electrode being relatively short as compared to said elongated electrode; and an insulated body attaching said electrodes to but electrically separating said electrodes from said conductor cable a distance axially relatively great as compared to the length of said pick-up electrode.

11. Electrical logging apparatus according to claim 1 in which said elongated electrode is from approximately 60 to approximately 100 times as long as said pick-up electrode.

12. Electrical logging apparatus according to claim 10 in which said insulated body is from approximately 5 to approximately 10 times as long as said elongated electrode.

13. Electrical logging apparatus comprising: an elongated electrode; a pick-up electrode positioned adjacent one end of said elongated electrode, said pick-up electrode being relatively short and being spaced a relatively short distance from said elongated electrode, as compared with the length of said elongated electrode, said elongated electrode being electrically insulated from said pick-up electrode and electrically isolated, except by way of contact with surrounding conductive fluid contained within a borehole; means to lower said electrodes together through a borehole; and means to measure the electric potential difference between said pick-up electrode and an electrically grounded point remote from said pick-up electrode.

14. Apparatus in accordance with claim 13 in which said means to lower said electrodes includes means electrically insulating said electrodes from said lowering means and shielding said lowering means from contact with borehole fluid for a distance above said electrodes which is relatively great as compared with the length of said pick-up electrode.

15. A method of electrically logging a borehole containing a conductive fluid comprising: suspending an elongated electrode axially in the borehole to be logged, said elongated electrode being electrically isolated except through contact with surrounding fluid in the borehole; suspending a relatively short test electrode in the said borehole adjacent the lower end of said elongated electrode and electrically insulated therefrom except through contact with said fluid, the space between said electrodes being small as compared to the length of said elongated electrode; simultaneously moving the said electrodes along the borehole while maintaining the relative positions of said electrodes constant; establishing a grounded connection at a point remote from said electrodes; and measuring the potential difference between said test electrode and said grounded connection as said electrodes are moved along said borehole.

THOMAS R. HOMER.

REFERENCES CITED

The following references are of record in the file of this patent:

UNITED STATES PATENTS

| Number | Name | Date |
| --- | --- | --- |
| 2,281,766 | Hawley | May 5, 1942 |
| 2,347,794 | Piety | May 2, 1944 |
| 2,376,168 | Mounce | May 15, 1945 |